April 10, 1928.
M. A. KNAPP
1,665,743
HYDRAULIC TRANSMISSION MECHANISM
Filed Nov. 17. 1926   2 Sheets-Sheet 1
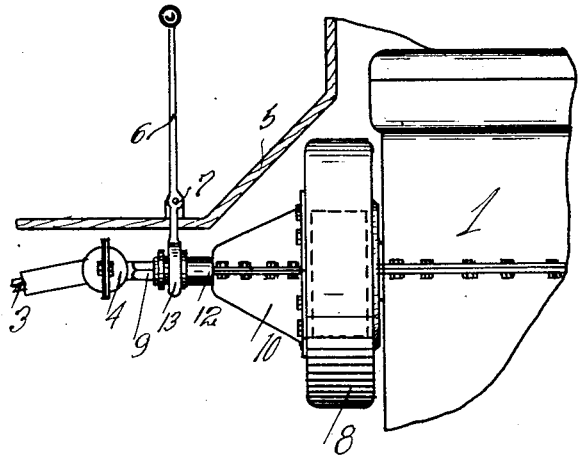
Fig.1
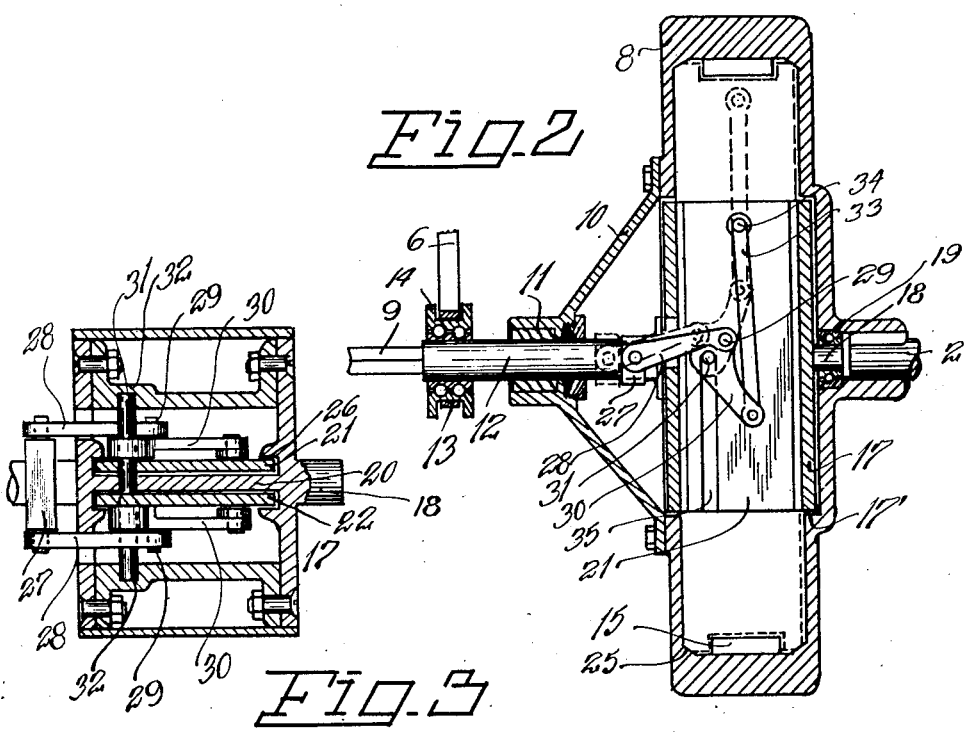
Fig.2
Fig.3
Inventor
Merritt A. Knapp
Herbert E. Smith
By
Attorney April 10, 1928.

M. A. KNAPP 1,665,743

HYDRAULIC TRANSMISSION MECHANISM

Filed Nov. 17, 1926　　2 Sheets-Sheet 2

Inventor

Merritt A. Knapp

By Herbert E. Smith

Attorney

Patented Apr. 10, 1928.

1,665,743

UNITED STATES PATENT OFFICE.

MERRITT A. KNAPP, OF ROSALIA, WASHINGTON.

HYDRAULIC TRANSMISSION MECHANISM.

Application filed November 17, 1926. Serial No. 148,915.

My present invention relates to improvements in hydraulic transmission mechanism especially adapted for use in the propulsion of automotive vehicles, air-craft and watercraft. By the utilization of the mechanism of my invention I am enabled to produce a variable speed transmission mechanism for automobiles which is comparatively simple in construction, and involves the use of a minimum number of parts. The transmission mechanism is adapted for a direct mechanical and hydraulic drive which is positive, and speeds varying from this direct drive may readily be attained by the manipulation of an operating lever.

In carrying out my invention I utilize a standard type of fly wheel and crank shaft of an internal combustion engine as the driving member of the transmission, and the propeller shaft of the automotive vehicle is used as the driven member of the transmission mechanism. Within the fly wheel or drive member is enclosed a driven head connected with the driven shaft, and radially extensible blades are carried by the driven head for hydraulic and mechanical connection with the fly wheel or drive member.

The invention consists in certain novel combinations and arrangements of parts involving the driving and driven members as will hereinafter be more fully described and claimed.

In the accompanying drawings I have illustrated one complete example of the physical embodiment of my invention wherein the parts are combined and arranged according to the best mode I have so far devised for the practical application of the principles of my invention.

Figure 1 is a view in side elevation showing the hydraulic transmission mechanism of my invention, together with a portion of a motor, and also the propeller shaft.

Figure 2 is an enlarged longitudinal sectional view of the transmission mechanism showing the ends of the aligned driving shaft and driven shaft.

Figure 3 is a detail longitudinal sectional view of the rotary driven head.

Figure 4:
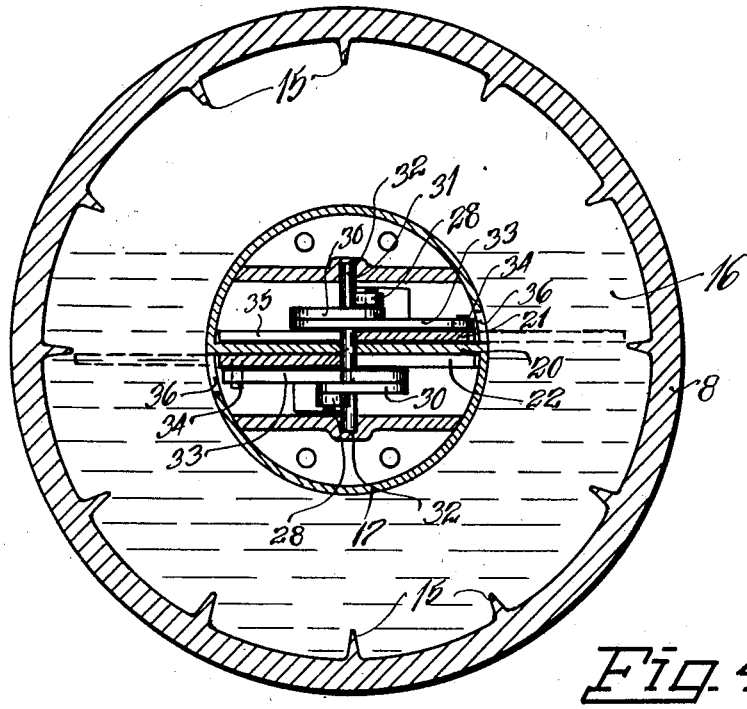
Figure 4 is a transverse sectional view through the fly wheel and its interior driven head.

In the preferred form of my invention illustrated in the drawings the mechanism is adapted for use with automotive vehicles, but it will be understood that the mechanism may be used in various other ways. For purposes of illustration and description I shall hereinafter refer to the invention as applied to an automobile, and in Figure 1 the numeral 1 designates a motor or engine. The crank shaft 2 of the engine is used as the driving shaft, and the propeller shaft 3 for the vehicle is used for the driven shaft. A universal joint 4 is shown as one element connecting these shafts, and the latter are located beneath the floor indicated as 5. The shift lever 6 is located in the usual position for use on automobiles, and is pivoted at 7 in order that it may be swung longitudinally of the driven shaft.

The fly wheel 8 is of a hollow construction to form an oil chamber, and is keyed or otherwise fixed to revolve with the crank shaft 2. Between the universal joint 4 and the transmission mechanism, the driven shaft is formed with a square section 9, and the fly wheel is fashioned with a conical bearing head 10 and bearing hub 11 through which a slide sleeve 12 may reciprocate. This sleeve is slidable longitudinally on the squared or angular section 9 of the driven shaft. The slide sleeve 12 is reciprocated from the shift lever 6, which lever is fashioned with a fork 13 that straddles the spool 14 which is journaled on the slide 12. Thus it will be apparent that by shifting the lever 6 the slide 12 may be reciprocated in the bearing hub 11, for the purpose of varying the relation between the hollow fly wheel 8 as the driving member, and the driven member or head. The interior of the fly wheel is provided with inwardly extending fins 15, spaced apart at suitable intervals within the interior periphery of the fly wheel. The interior of the fly wheel as well as the interior of the conical bearing head 10, forms an oil chamber which is designated as 16, and oil to the level indicated in Figure 4 is maintained within the driving head or fly wheel.

The driven head is indicated as a whole by the numeral 17 and is fashioned in the form of a cylinder with closed ends arranged concentrically within the fly wheel, and the latter is provided with an annular groove or recess 17' for retaining the driven head in position. The driven head is fashioned with a journal or bearing boss 18, and an anti-friction bearing 19 is provided between this journal and the fly wheel as best seen in Figure 2. At the other side of the driven head the latter is supported by means of the angular shaft 9 and the slide 12 in the hub 11.

The driven head or cylinder 17 is provided with a transverse partition 20, and at opposite sides of this partition are arranged a pair of radially extensible blades 21 and 22. These blades are designed to be projected from the head, and retracted toward the head, by the operation of the shift lever 6.

Figure 6:
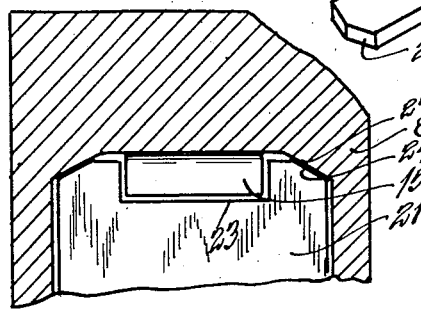
Figure 6 is an enlarged detail view showing a direct connection between one of the blades and the fly wheel or driving member.

At the outer ends of the blades they are notched as at 23, and these notches are of sufficient length to accommodate the fins 15 of the fly wheel. It will be noted that these fins terminate at each end short of the side walls of the fly wheel, thus leaving two annular tracked ways within the fly wheel. In Figure 6 it will be seen that the ends of the notched blades have corner bevels 24, and the two annular track ways of the fly wheel have beveled faces 25 complementary to these beveled corners of the blades. Thus when the blades are projected their maximum distance from the driven head, these two blades frictionally engage the fly wheel to insure a direct and positive, mechanical drive from the fly wheel to the driven head. The speed at which the automobile may be driven may be varied from this direct drive by varying the position of the projecting blades with relation to the driven head. Thus for a low gear drive the blades are projected slightly in order that the rotary movement of the driving shaft may be transmitted to the driven shaft by contact of the oil in the chamber against the slightly projecting blades. On the other hand, when the blades are projected into frictional contact with the fly wheel for a direct drive, the blades receive both a fluid pressure and a mechanical drive from the fly wheel.

Figure 5:
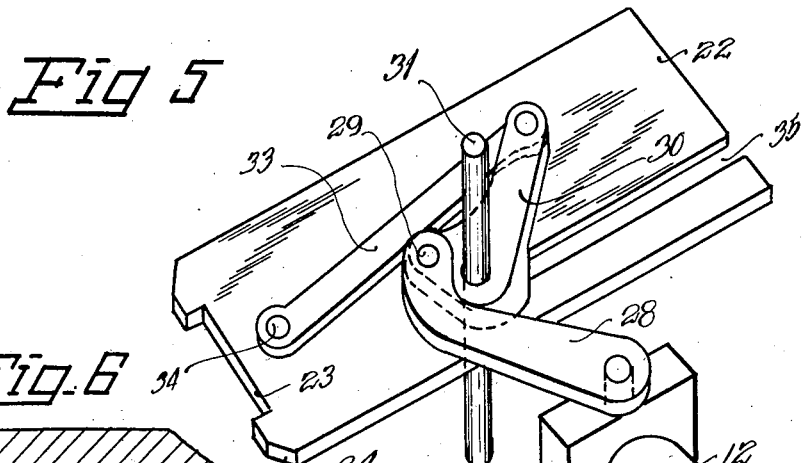
Figure 5 is a perspective view of one of the radially extensible blades of the driven head.

For projecting and retracting the blades in a substantially radial direction they are guided at their opposite edges in groves 26 in the inner faces of the end walls of the driven member. As best seen in Figure 5 the slide 12 is provided with a rigid block 27, and this block has a pair of complementary angular links 28 pivoted thereto, and extending generally in a direction parallel with the axis of the driven shaft. These links are pivoted at 29 to a pair of bell crank levers 30, and these levers are fixed on a pin 31 having its ends in bearings 32 of the driven head. The bell crank levers 30 are each provided with a link 33 and each link is pivoted as at 34 near the outer end of a blade. The blades are slotted at 35 to provide for movement thereof with relation to the fulcrum pin 31 which extends through these slots, and the rotary driven head is provided with slots 36 through which the respective blades are adapted to be projected and retracted when operated by the shift lever 6.

From the above description taken in connection with my drawings it will be apparent that I have provided a transmission mechanism comprising a minimum number of parts, which eliminates the necessity for numerous gears and pinions, and insures a forward drive of various speeds.

Having thus fully described my invention what I claim as new and desire to secure by Letters Patent is:

1. The combination with a hollow fly wheel having a series of fins terminating short of the side walls of said wheel, of a rotary driven head journaled in said wheel, and a plurality of radially extensible blades having notched ends carried by said head for frictional engagement with said fly wheel.

2. The combination of a hollow fly wheel having a series of fins, and spaced annular tracks at the ends of said fins having beveled surfaces, of a rotary driven head journaled in the wheel, and a plurality of radially extensible blades having notched ends and beveled corners carried by said head, for the purpose described.

3. In a hydraulic transmission mechanism the combination with a driven head, of a pair of slotted radially extensible blades, a fulcrum pin journaled in the head and passing through said slotted blades, bell crank levers on said pin and links connecting said levers with the respective blades, a slide and means for operating it, and connections between said slide and said bell crank levers.

In testimony whereof I affix my signature.

MERRITT A. KNAPP.